UNITED STATES PATENT OFFICE.

JOHN L. KELLOGG, OF BATTLE CREEK, MICHIGAN, ASSIGNOR TO KELLOGG TOASTED CORN FLAKE CO., OF BATTLE CREEK, MICHIGAN.

COFFEE SUBSTITUTE OR COFFEE CEREAL.

1,163,932.  Specification of Letters Patent.  Patented Dec. 14, 1915.

No Drawing.  Application filed September 16, 1912. Serial No. 720,470.

*To all whom it may concern:*

Be it known that I, JOHN L. KELLOGG, a citizen of the United States, residing at Battle Creek, Michigan, have invented certain new and useful Improvements in Coffee Substitutes or Coffee Cereal, of which the following is a specification.

This invention relates to improvements in coffee substitutes or cereal coffee.

The objects of this invention are to provide an improved coffee substitute and an improved process of preparing the same.

In carrying out my invention, sixteen pounds of starch, about fourteen pounds of New Orleans molasses are mixed into a thick dough without the addition of water and the same is baked in an ordinary baking oven at a temperature of from 250 to 300 degrees Fahrenheit for a period of about five hours. It takes about this length of time to thoroughly dry the moisture out of the molasses. The heat is sufficient to convert very much of the starch to dextrin and to a considerable extent caramelize the sugar without burning the same. There is thus produced a very intimate mixture of the caramel and dextrin along with the constituents that occur in the New Orleans molasses. The material at this stage is found to be air dry, and I grind the same, reducing it to granules about the size of a pea. This granular mass is then placed in a regular rotary coffee roaster, which is kept at a temperature of from 300° to 330° F. and the granules are roasted like coffee to a chocolate brown, which is accomplished in about thirty minutes. During this roasting process, the surplus of vapor is drawn out by means of a fan. The roasting is effected by direct heat from a gas flame beneath the roaster, which consequently acts directly upon the mixture and subjects the same in passing to a good deal higher temperature than 300° to 330°, securing the roasting effect, however, without actually burning the material. After this roasting process, which by the way, is accomplished in lots of about 200 pounds in an 8 foot long drum about 3 feet in diameter, the material is ground thoroughly to an impalpable powder. When this is done, the entire material will be found to be soluble and will entirely disappear, leaving no residue when dissolved in hot water. The flavor is very similar to that of coffee.

Starchy materials can be treated in this same way and the starch will be completely converted and made soluble. There will be an insoluble residue ordinarily depending on the other constituent which in whole wheat flour, for instance, is inconsiderable.

Having thus described my invention, what I claim as new and desire to secure by Letters Patent is:

1. The process of preparing a coffee substitute consisting of admixing starch and New Orleans molasses in about the proportion of 16 lbs. starch to 14 lbs. molasses, and baking the dough thus formed in a comparatively shallow pan in dry heat at a temperature of from 250° to 300° for a period of substantially five hours, until the moisture has been practically driven therefrom, the sugar caramelized and the starch converted into dextrin; reducing the baked material into coarse granules substantially the size of a pea; roasting the said granular mass in a rotary drum coffee roaster at a temperature of from 300° to 330° for a period of thirty minutes, until a deep brown color, and removing the moisture during the roasting by suction means; and reducing the granules to an impalpable powder, as specified.

2. The process of preparing a coffee substitute, consisting of admixing a starchy material and New Orleans molasses to form a dough, baking the dough in a temperature of from 250° to 300° until the moisture is practically driven off and the sugar is caramelized and the starch converted to dextrin; reducing this material to coarse granules, and roasting the granular mass in a coffee roaster at a temperature of from 300° to 330° until the same is a deep brown color, and thereafter reducing the granular mass to a powder, as specified.

3. The process of preparing a coffee substitute, consisting of admixing a starchy material and New Orleans molasses to form a dough, baking the dough in a temperature of from 250° to 300° until the moisture is practically driven off and the sugar is caramelized and the starch converted to dextrin; reducing this material to coarse granules, and roasting the granular mass in a coffee roaster at a temperature of from 300° to 330° until the same is a deep brown color, as specified.

4. The process of preparing a coffee substitute, consisting of admixing a starchy material and molasses to form a dough, baking the dough in a temperature of from 250° to 300° until the moisture is practically driven off and the sugar caramelized and the starch converted to dextrin; reducing this material to coarse granules, and roasting the granular mass in a coffee roaster at a temperature of from 300° to 330° until the same is a deep brown color, as specified.

5. A coffee substitute compound consisting of a powder formed of an admixture of caramelized New Orleans molasses and dextrinized starch.

In witness whereof, I have hereunto set my hand and seal in the presence of two witnesses.

JOHN L. KELLOGG. [L. S.]

Witnesses:
CHAS. M. MARBLE,
H. E. RALPH.